UNITED STATES PATENT OFFICE.

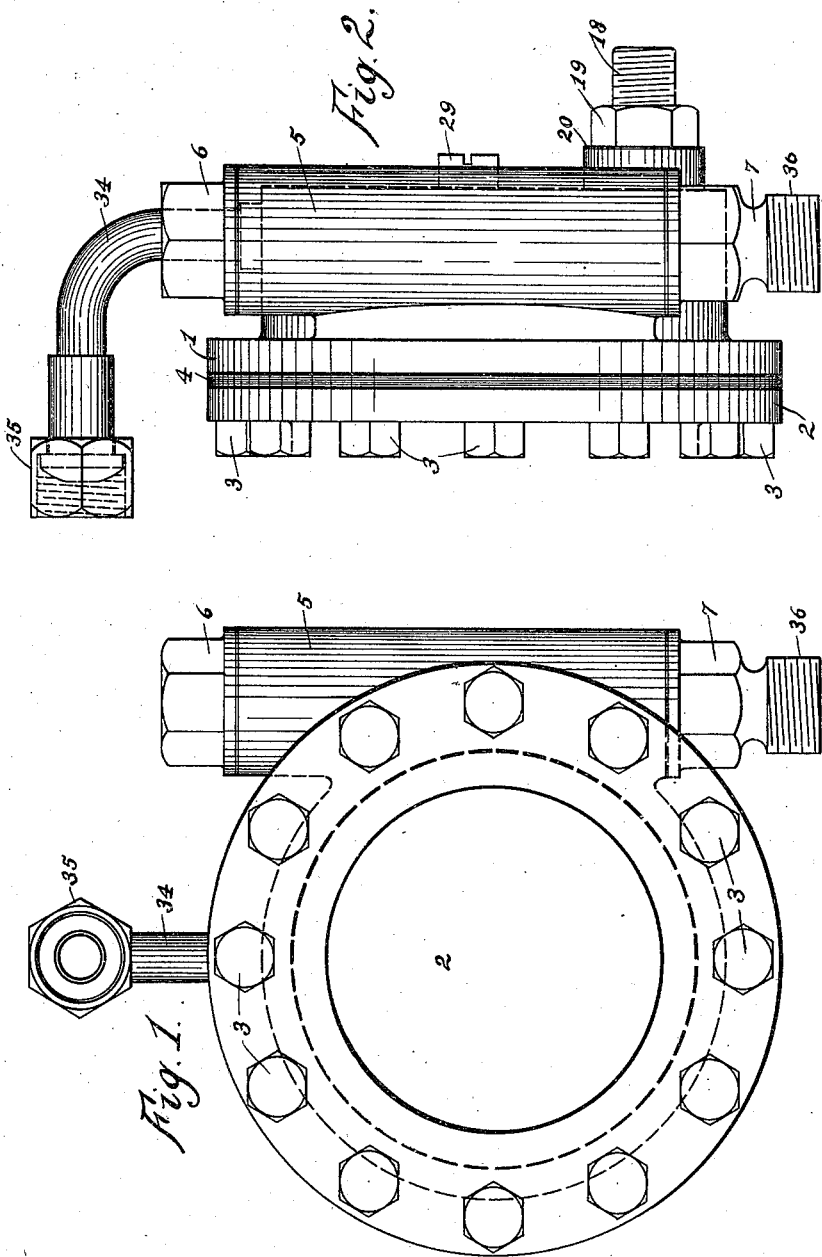

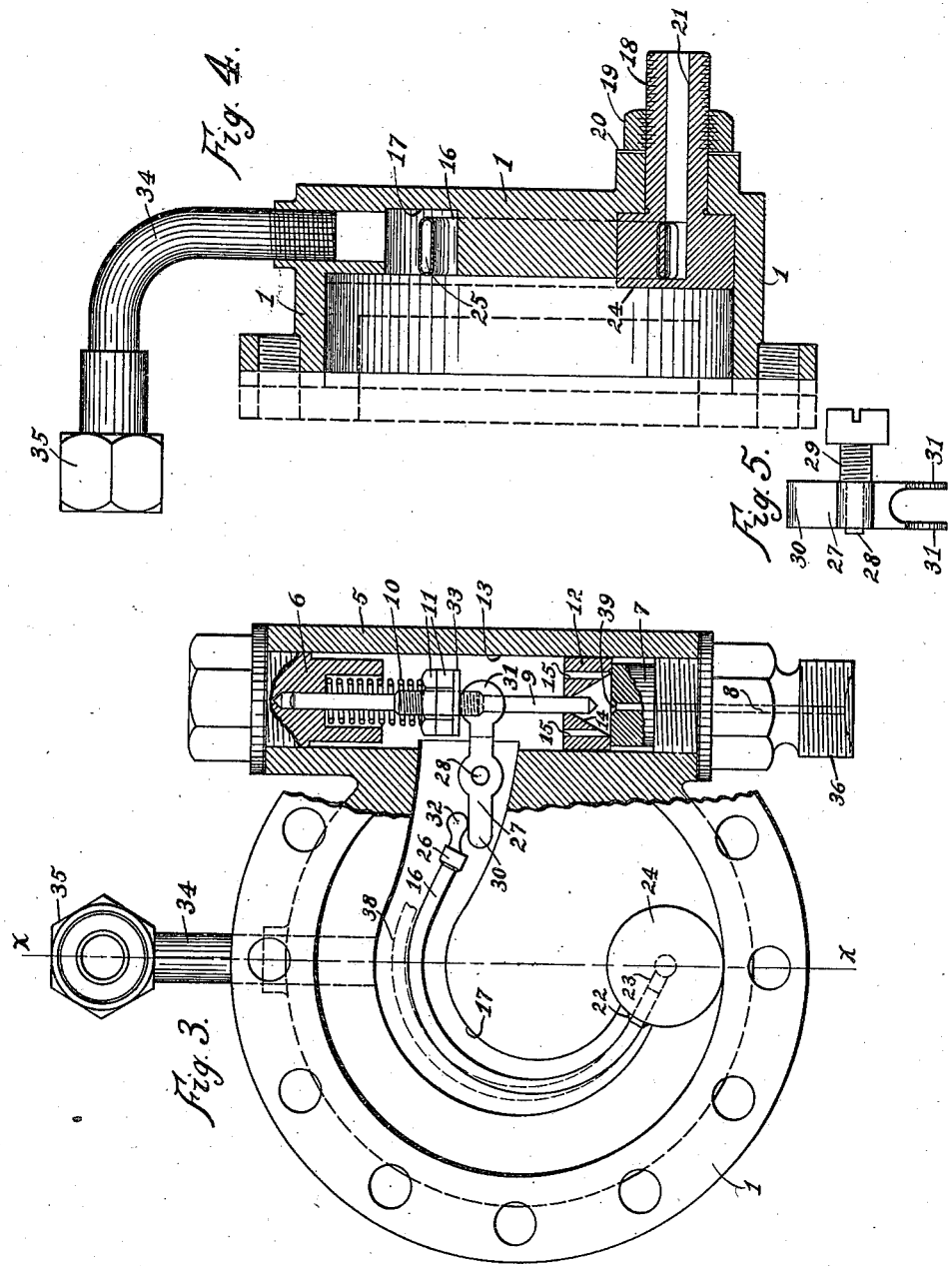

ALVA THRIFT EDMONSON, OF CHICAGO, ILLINOIS.

PRESSURE-REGULATED VALVE.

973,016.  Specification of Letters Patent.  Patented Oct. 18, 1910.

Application filed October 11, 1909. Serial No. 522,133.

*To all whom it may concern:*

Be it known that I, ALVA THRIFT EDMONSON, a citizen of the United States of America, residing at Chicago, in the county of Cook and State of Illinois, have invented a new and useful Pressure-Regulated Valve, of which the following is a specification, reference being had to the accompanying drawings illustrating same.

My invention relates to valves and also to pressure-controllable mechanism, and more in particular to a combination of these mechanisms wherein the pressure-controllable mechanism controls or regulates the valve.

The principal objects of my invention are, to provide improved apparatus of the type above mentioned, wherein any fluid pressure, either liquid or gaseous, may cause the proper control or regulation of the valve; to provide improved means for automatically controlling the supply of liquid or gaseous fuel to a burner, such as a burner used to produce steam in a steam generator; and to provide simplicity and efficiency in such a device.

Other objects will be apparent from the following specification.

In the drawings, illustrating the preferred form of my invention, Figure 1 is an elevation of the complete device of the invention; Fig. 2 is a side elevation of Fig. 1; Fig. 3 is a view of the device of the invention taken the same as Fig. 1, with the cover and other portions removed to show the interior construction of the device; Fig. 4 is a cross-sectional view of the device of the invention, taken on plane $x$ $x$ of Fig. 3, with portions shown in elevation; and Fig. 5 is a plan view of a portion of the apparatus shown in Fig. 3, showing the details thereof.

Like characters refer to like parts in the several figures.

The device of this invention is capable of various uses, one of which is to regulate the supply of fuel, such as gasolene, to a burner for a steam generator, such as the steam generator of a steam automobile, and thus regulate the steam pressure in the steam generator. By this means the steam pressure in a steam generator may be automatically kept practically constant.

It is well known that with the steam-pressure regulators now in use it is a hard matter to maintain a practically constant steam pressure in an automobile steam generator. With the device of this invention, however, it is possible to easily maintain a uniform steam pressure in such a steam generator. The advantages of readily accomplishing such a result are very apparent.

In the drawings, 1 is a casing, preferably a brass casting, and 2 is a removable cover therefor, the cover being securely bolted to the casing by bolts or screws 3 3. I preferably place a gasket 4 between the cover 2 and the casing 1, to make a tight joint therebetween. The casing 1 has a hollow cylindrical portion 5 thereon, for containing parts of the apparatus. In one end of the portion 5 is screwed a plug 6 preferably as shown, and in the other end of the portion 5 is screwed another plug 7, preferably as shown. The plugs 6 and 7 tightly close the ends of the portion 5. The plug 7 is provided with a hole 8 therethrough, the inner end of the hole 8 being beveled preferably as shown at 39 to provide a tapered valve seat for the conically-shaped end of a pin 9 carried within the portion 5, the pin 9 and hole 8 providing a valve adapted to be opened and closed. The other end of the pin 9 is carried within an opening in the plug 6, preferably as shown, a coil spring 10 acting on the pin 9 through the agency of the adjustable nuts 11 and tending to seat the pin 9 to close the valve formed by the pin 9 and seat 39 when not restrained from doing so. I preferably place a cylindrical disk or member 12 within the opening 13 in the portion 5, to serve as a guiding member for one end of the pin 9, this member 12 being preferably cut away as shown at 14 and provided with holes 15 15 therethrough, to provide a suitable inlet (or outlet) passage to the valve passage 8 independently of the opening between the pin 9 and the portion 12, which latter opening may be made as large or small as desired, even to a sliding fit.

A hollow, curved, pressure-controllable member 16 is located in a curved recess 17 in the casing 1, preferably as shown, the member 16 being carried by a hollow bolt 18 which extends through the wall of the casing 1 preferably as shown in Fig. 4. The bolt 18 is rigidly held in place by a nut 19, a washer 20 forming a tight joint between the casing 1 and the nut 19 around the bolt 18. The member 16 has one end thereof inserted into a hole 23 extending through one side of the head 24 of the bolt 18 from the longitudinal passage 21 in the bolt 18, so as to connect the passage 21 with the passage 25 in the member 16, the latter being preferably brazed to the bolt 18 at 22 so as to form a tight joint therebetween. The free end of the member 16 is sealed shut by a cap 26 which is preferably brazed thereto.

A lever 27 is fulcrumed at 28 on a bolt 29 which extends through the wall of the casing 1, the end 30 of the lever 27 being acted upon by a projection 32 of the cap 26, and the end 31 of the lever 27 engaging the adjustable washer 33 which is held in place by the adjustable nuts 11. From Fig. 5 it will be seen that the end 31 of the lever 27 is bifurcated so as to straddle the pin 9. The coil spring 10 acts on the lever 27, through the agency of the nuts 11 and the washer 33, against the pressure of the portion 32 on the end 30 of the lever 27.

The pipe 34 is connected with the curved recess 17 preferably as shown in Figs. 3 and 4. The pipe 34 carries a nut 35, preferably of the type shown in Fig. 2, by means of which nut any suitable pipe may be connected with the pipe 34, in a manner well understood. The exterior end of the plug 7 is preferably threaded at 36 so that it may be attached to any suitable pipe. From this construction it will be readily seen that the passage through the valve is from the inlet (or outlet) pipe 34, through the recess 17 in the casing 1 to the opening 13 in the portion 5, and then through the holes 15 15 and the cavity 14 to and through the outlet (or inlet) passage 8. Thus it will be readily seen that controlling the longitudinal movement of the pin 9 with respect to the inner end 39 of the hole 8, will consequently control the fluid passage through the valve and the device of the invention.

The pipe for supplying the pressure-controllable member 16 with fluid pressure for operating the member 16, may be attached to the hollow bolt 18 in a manner well understood. This pipe may be connected to any suitable source of pressure, as, for example, with a steam generator of an automobile.

The operation of the device is as follows: When there is no fluid pressure in the pressure-controllable member 16 greater than atmospheric pressure, the end 32 of this pressure-controllable member presses against the end 30 of the lever 27, due to the springiness of the member 16, and thereby raises the pin 9 from its valve seat 39 and holds it in the position shown in Fig. 3, against the action of coil spring 10. In this position of the pin 9 the valve formed by the pin 9 and seat 39 is fully open. Now as the fluid pressure in the pressure-controllable member 16 increases, such pressure coming from the opening 21 through the bolt 18, the member 16 is extended toward its dotted-line position 38 shown in Fig. 3, in a manner well understood by those familiar with such pressure-controllable members. As the member 16 approaches the position 38, the portion 32 recedes from the end 30 of the lever 27 and thereby permits the coil spring 10 to move the valve pin or plug 9 toward its seat 39 and thus tend to close the valve. If the member 16 is sufficiently extended or expanded by the increased pressure therein, the valve formed by the pin 9 and seat 39 will be entirely closed by the action of the spring 10 on the pin 9. Thus it can be readily seen how a variation of pressure in the member 16 controls the valve and thereby controls the passage 34, 17, 13, 8, through the apparatus. By adjusting the nuts 11 and washer 33 on the pin 9, the valve may be made to open or close at any desired position of the member 16.

When the device of this invention is applied to a steam automobile to regulate the fuel supply to the steam generator, an increase of steam pressure over that desired to be maintained to operate the engine, will automatically reduce the supply of fuel, such as gasolene, to the steam generator and thereby keep the steam pressure from becoming still higher. If the steam pressure becomes lower than that desired to be maintained, the supply of fuel to the steam generator will be automatically increased so as to bring the pressure up to the desired value.

I do not wish to limit this invention to the particular details herein set forth, nor to any particular materials for the various parts, as various modifications may be made therein without departing from the scope of the appended claims.

What I claim as my invention is:

1. A device of the character described comprising a casing and a removable cover therefor, said casing having a hollow cylindrical portion on one side thereof, screw plugs for the ends of the said cylindrical portion, one of the said plugs having an opening therethrough beveled at its inner end to form a valve-plug seat, a pin within the said cylindrical portion and extending longitudinally thereof, one end of the said pin being carried within an opening in one of the said screw plugs and the other end of the said pin being conically shaped to provide a suitable valve plug for the said valve-plug seat, a guiding disk for the last-mentioned end of the said pin, the said guiding disk having an opening therethrough to provide a fluid passage to the said valve-plug seat, a suitable opening through the wall of the said casing to the valve, a curved elliptical tube carried within the said casing, a hollow bolt attached to the said tube and extending through the wall of the said casing whereby pressure may be applied to the interior of the said tube, an adjustable nut on the said pin, a coil spring acting between one of the said screw plugs and the adjustable nut and tending to seat the valve plug, and a lever fulcrumed between its ends and connecting the free end of the said tube with the adjustable nut, the said tube normally acting on the said lever against the coil spring to hold the valve plug from its seat, an increase of pressure in the said tube tending to straighten same and thereby permit the coil spring to operate the valve plug toward its seat for purposes substantially as described.

2. A device of the character described comprising a casing and a removable cover therefor, said casing having a chamber on one side thereof, screw plugs for the said chamber, one of the said plugs having an opening therethrough beveled at its inner end to form a valve-plug seat, a pin within the said chamber, one end of the said pin being carried within an opening in one of the said screw plugs and the other end of the said pin being conically shaped to provide a suitable valve plug for the said valve-plug seat, a guiding disk for the last-mentioned end of the said pin, the said guiding disk having an opening therethrough to provide a fluid passage to the said valve-plug seat, a suitable opening through the wall of the said casing to the valve, a curved elliptical tube carried within the said casing, a hollow bolt attached to the said tube and extending through the wall of the said casing whereby pressure may be applied to the interior of the said tube, an adjustable nut on the said pin, a coil spring acting between one of the said screw plugs and the adjustable nut and tending to seat the valve plug, and a lever fulcrumed between its ends and connecting the free end of the said tube with the adjustable nut, the said tube normally acting on the said lever against the coil spring to hold the valve plug from its seat, an increase of pressure in the said tube tending to straighten same and thereby permit the coil spring to operate the valve plug toward its seat for purposes substantially as described.

As inventor of the foregoing I hereunto subscribe my name, this 7th day of October, 1909.

ALVA THRIFT EDMONSON.

Witnesses:
S. M. JEFFREY,
FREDERICK R. PARKER.